United States Patent [19]

Longyear et al.

[11] Patent Number: 5,044,697

[45] Date of Patent: Sep. 3, 1991

[54] BRAKE VALVE CONTROL SYSTEM

[75] Inventors: Douglas M. Longyear, Pasadena; Stanley R. Bluhm, Manhattan Beach, both of Calif.

[73] Assignee: Crane Company, Burbank, Calif.

[21] Appl. No.: 357,363

[22] Filed: May 26, 1989

[51] Int. Cl.⁵ .................. B60T 11/18; B60T 15/16
[52] U.S. Cl. .................. 303/14; 244/111; 303/113; 303/117; 303/93
[58] Field of Search .................. 303/92, 93, 117, 113, 303/116, 13-18, 25-28, 84.1, 84.2, 6.01, 7-9, 94, 95, 100; 244/111; 188/355-359, 16, 354

[56] References Cited

U.S. PATENT DOCUMENTS

| | | | |
|---|---|---|---|
| 3,503,655 | 3/1970 | Heimler | 303/84.2 X |
| 3,920,282 | 11/1975 | Devlieg | 244/111 X |
| 4,076,331 | 2/1978 | Devlieg | 303/93 |
| 4,120,540 | 10/1978 | Devlieg | 303/117 |
| 4,166,654 | 9/1979 | Snodgrass | 303/14 |
| 4,591,213 | 5/1986 | Rapoport | 303/93 |
| 4,640,475 | 2/1987 | Zoerb | 244/111 |
| 4,770,470 | 9/1988 | Tarumizu et al. | 303/13 X |
| 4,792,192 | 12/1988 | Tveitane | 303/14 X |

Primary Examiner—Douglas C. Butler
Attorney, Agent, or Firm—Fulwider, Patton, Lee & Utecht

[57] ABSTRACT

The brake valve control system for an aircraft wheel bracking system includes primary and backup brake valve control subsystems and isolates and switches between subsystems. Certain portions of the entire braking system are shared, and those portions which are not shared are isolated but interconnected for switching from a primary brake control mode to a backup subsystem upon failure of the primary subsystem. A unique metering spool valve, and the linking of metering spool valves and servocontrol valves with either a tandem selector valve or interlinked primary and secondary selector valves allows for significant reduction in weight and complexity for the backup or override system.

13 Claims, 3 Drawing Sheets

BRAKE VALVE CONTROL SYSTEM

BACKGROUND OF THE INVENTION

1. Field of the Invention

This invention relates generally to aircraft automatic braking systems, and particularly relates to a hydraulic brake valve control system for use in an aircraft wheel braking system, utilizing a primary brake valve control subsystem and a backup brake valve control subsystem.

2. Description of Related Art

Conventional aircraft braking systems typically have a normal operating mode, either under pilot or computer control, and a backup or override system. Such backup systems can consist of a full control system, similar to the normal system, or a simplified system supplied by a hydraulic accumulator or air bottle. The degree of complexity and extent of duplication of the normal operating control system that is practical depends largely upon the weight and cost of the aircraft.

Large commercial passenger transport, for example, normally have a complete dual system. Such primary and backup systems are commonly isolated by a "relay valve" which permits only one system to be in command at any given time. If, for some reason, there is a deterioration in the primary system, the pilot or automatic control can switch to the backup system, and the relay then switches over, to permit braking to be controlled through the backup system. As an alternative to hydraulic switching large electrical shut off valves can be used to isolate one or more brake lines. These shut off valves are typically incorporated in brake-by-wire systems, where computer control is the primary source of braking commands. The electrical shut off valves are large in order to carry the full flow of anti-skid driven brake lines. The design of such valves is often further complicated when they must handle two to four brake lines. Computerized and microprocessor based brake control systems are known from U.S. Pat. Nos. 4,402,047 and 4,749,238, for example. Automatic braking systems for aircraft utilizing a logic control circuit and analog control systems, and a metering valve with a metering spool sliding between on and off positions are generally known from U.S. Pat. No. 4,120,540. U.S. Pat. No. 4,591,213 discloses a braking system which switches between two different primary and secondary subsystem, based upon temperature and friction sensed at the brakes, rather than based upon failure of one of the subsystems.

It would be desirable to provide a brake valve control system for aircraft that eliminates the need for a relay valve or large electrical shut off valves, and also reduces the weight and cost of providing a backup braking system. The present invention addresses these needs.

SUMMARY OF THE INVENTION

The present invention provides a brake valve control system for use in an aircraft wheel braking system which includes primary and backup brake valve control subsystems and a means for isolating and switching between control channels. Certain portions of the entire braking system are shared, and those portions which are not shared are isolated but interconnected for switching from a primary brake control mode to a backup subsystem upon failure of the primary subsystem. A unique metering spool valve, and the linking of metering spool valves and servocontrol valves with an interlinked tandem selector valve allows for significant reduction in weight and complexity for the subsystem selection device.

Briefly and in general terms, the brake valve control system of the invention includes a brake actuator means in an aircraft wheel braking system, a primary brake valve control subsystem having a primary source of brake pressure connected to the brake actuator means, a secondary brake valve subsystem with a secondary source of brake pressure connected to the brake actuator means, and a subsystem selector for causing the secondary brake valve control system to control the operation of the brake actuator means in the event of failure of the primary brake valve control subsystem.

In one currently preferred embodiment, primary and secondary valve selectors are provided for controlling the primary and secondary brake valve control subsystems, and each brake valve control subsystem includes a control valve connected between the brake pressure source and brake actuator means, and a servovalve controlling fluid communication between a source of brake pressure and return line. In this embodiment, the valve selectors are connected to a portion of the control valve operative to communicate pressure for moving a stop member which allows each control valve to be either active or inactive. Logic arrangement of the selector valve results in mutual exclusivity so that when the primary selector deactivates the primary control valve, the secondary valve selector concomitantly activates the secondary control valve in the secondary subsystem.

Other aspects and advantages of the invention will become apparent from the following detailed description, and the accompanying drawings, illustrating by way of example the features of the invention.

DETAILED DESCRIPTION OF THE INVENTION

Figure 1:
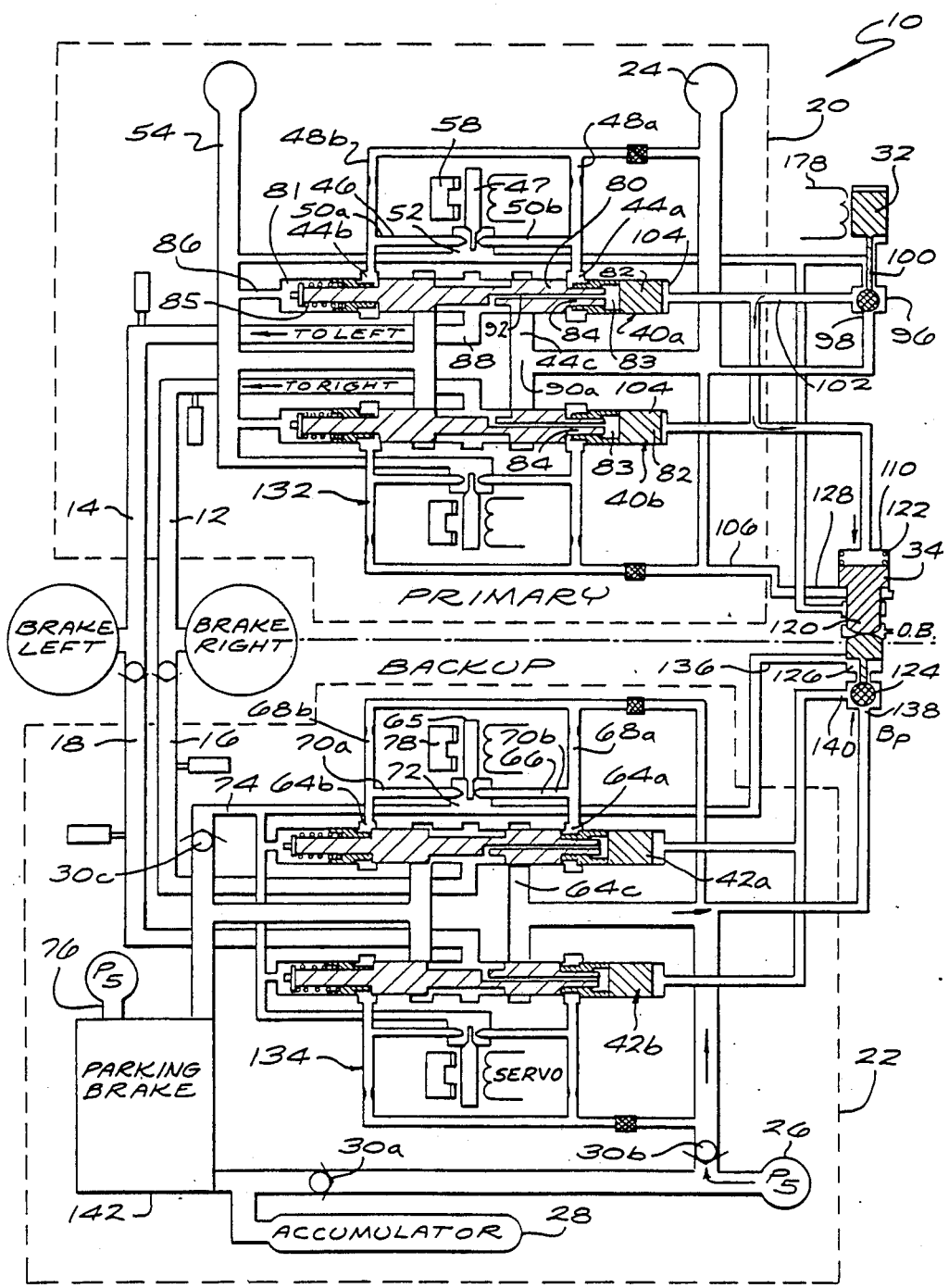
FIG. 1 is a schematic diagram of the primary and secondary valve control subsystems and primary and secondary valve selectors.

As is shown in the drawings, which are provided for the purpose of illustration, the invention is embodied in a brake valve control system for use in an aircraft wheel braking system which includes a brake actuator, a primary brake valve control subsystem, and a secondary brake valve control subsystem. A subsystem selector means operates to select either the primary or the secondary brake valve control subsystem to be active in controlling the brake system, and to override failures in either subsystem. The system achieves significant weight reduction in providing a backup brake valve control subsystem by providing relatively simple means to isolate a subsystem while the other is in operation. Each brake valve control subsystem includes a servovalve mechanism, and a control valve having a metering spool movable to modulate brake pressure and operatively connected to the subsystem selector means. The isolation of one brake subsystem channel from the other occurs by driving the metering spools in the control valves of one subsystem to one position, while the spools in the other control valves are allowed to move normally. This is accomplished either by primary and secondary valve selectors being hydraulically connected so that the primary valve selector drives the secondary valve selector, or by a tandem selector valve. Primary and secondary control processor units preferably provide control signals to the servovalves and subsystem selectors for fault monitoring. Internal communication links between a monitor and both of the control processors allows monitoring by an aircraft central monitoring computer.

In accordance with the invention, there is therefore provided a brake valve control system for use in an aircraft wheel braking system including brake actuator means, the brake valve control system comprising a primary brake valve control subsystem for controlling the brake actuator means, having a primary source of brake pressure in fluid communication with the brake actuator means; a secondary brake valve control subsystem for controlling the brake actuator means in the event of failure of the primary brake valve control subsystem, the secondary brake valve control subsystem having a secondary source of brake pressure in fluid communication with the brake actuator means; and subsystem selector means in fluid communication with the primary and secondary brake valve control subsystems operative to cause the secondary brake valve control subsystem to control the brake actuator means in the event of failure of the primary brake valve control subsystem.

The invention also provides for a brake valve control system for use in an aircraft wheel braking system having brake actuator means, comprising a primary brake valve control subsystem for controlling the brake actuator means, having a primary source of brake pressure in fluid communication with the brake actuator means; at least one primary control valve having an inlet in fluid communication with the primary source of brake pressure and an outlet in fluid communication with the brake actuator means; primary servo valve means in fluid communication with the primary source of brake pressure and in fluid communication with a primary brake pressure return line operative in a normal actuated position to modulate fluid pressure on the primary metering valve spool; the primary valve selector means having an outlet in fluid communication with a primary means for deactivating the primary control valve. The valve selector means has one inlet in communication with primary brake pressure source, and one inlet in communication with the primary brake return, and is operative to alternatively connect its outlet with either of these two inlets. The outlet is operative to deactivate the primary control valve by driving the primary metering valve spool to a position which blocks primary pressure source and communicates primary brake actuator means to the primary return. A secondary brake valve control subsystem for controlling the brake actuator means includes a secondary source of brake pressure in fluid communication with the brake actuator means; at least one secondary control valve having an inlet in fluid communication with the secondary source of brake pressure and an outlet in fluid communication with the brake actuator means; secondary servo valve means in fluid communication with the secondary source of brake pressure and in fluid communication with a secondary brake pressure return line operative in a normal actuated position to modulate fluid pressure on the secondary metering valve spool; the secondary valve selector means has an outlet in fluid communication with a secondary means for deactivating the secondary control valve, a first inlet in fluid communication with the secondary source of brake pressure and operative in a first position to open fluid communication between the secondary source of brake pressure and the secondary means for deactivating the secondary control valve, and operative in a second position to block communication between the secondary source of brake pressure and the means for deactivating. The secondary valve selector means includes a second inlet in fluid communication with the primary valve selector means outlet and operative to move the secondary valve selector means to the second position in response to pressure from the primary valve selector means outlet, whereby when the primary valve selector means is in an unactuated position, the primary control valve connects the primary brake actuator means to primary return, and the secondary control valve provides fluid communication with the brake actuator means.

As is shown in the drawings, a brake valve control system 10 includes a primary right brake actuator line 12, a primary left brake actuator line 14, a secondary right brake actuator line 16, and a secondary left brake actuator line 18. The primary brake valve control system 20 and the secondary brake valve control subsystem 22 control the application of brake fluid pressure to the right and left brake systems through these brake actuator lines. The primary control subsystem includes a primary brake pressure source 24, and the secondary control subsystem includes a secondary brake pressure source 26. The secondary brake pressure source may also include an accumulator 28 and a series of check valves 30a, 30b, and 30c to help maintain a controlled backup system pressure in the event that the brake pressure generating systems lose power, such as may occur and the primary brake subsystem fails.

Figure 3:
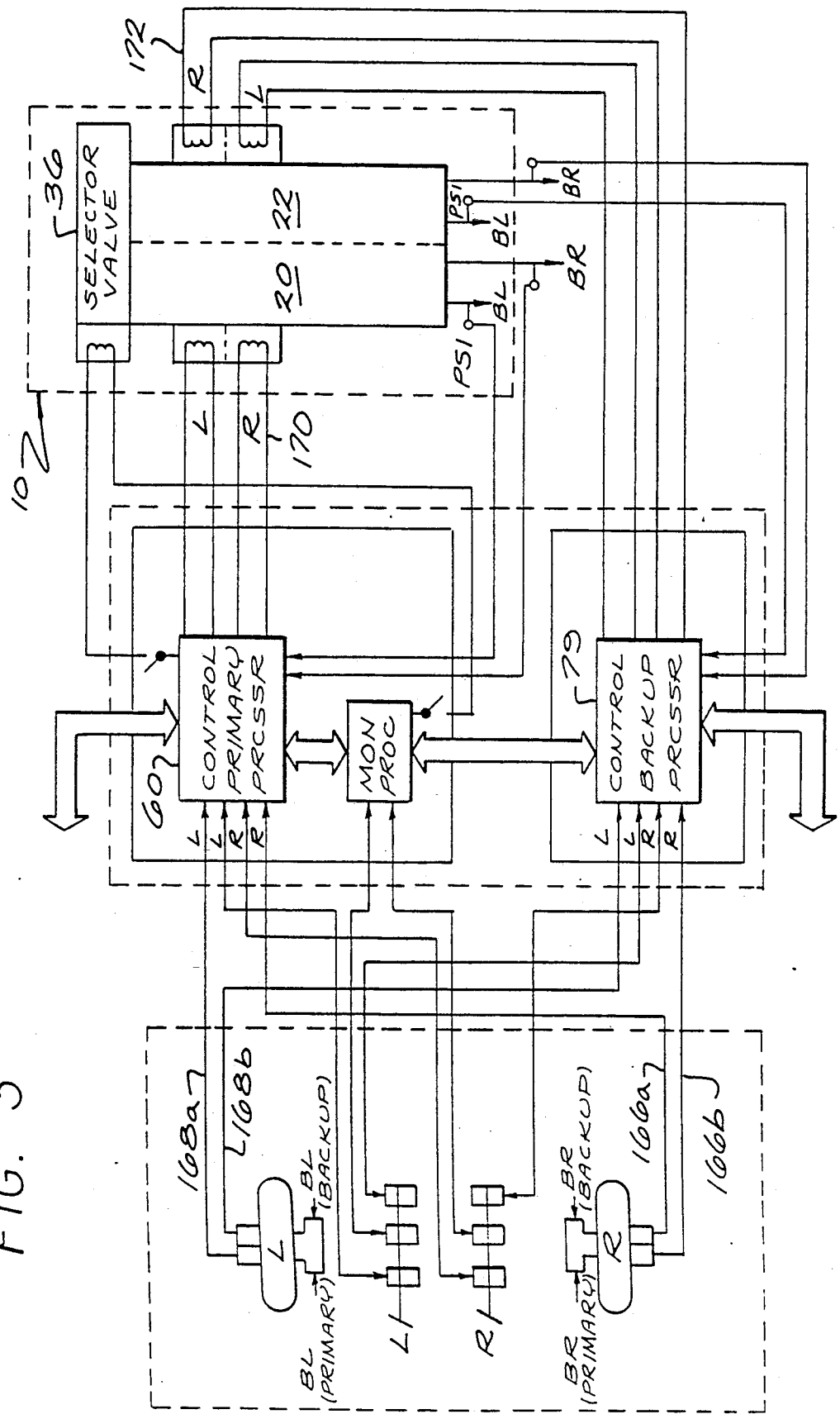
FIG. 3 is a schematic diagram of the brake valve control system with a tandem selector valve.

A preferred means for selecting between the primary and backup subsystems includes the primary solenoid valve selector 32 and the secondary valve selector 34. Alternatively, as is illustrated in FIG. 3, the subsystem selector means may comprise a unitary tandem subsystem selector valve 36.

The primary brake valve control subsystem includes a primary control valve 40a for the left brake actuator, and another primary control valve 40b for the right wheel brake actuator. Similarly, the secondary brake valve control subsystem includes a secondary control valve 42a for the right brake actuator, and another secondary control valve 42b for the left wheel brake actuator.

The left and right primary control valve are essentially identical, and the discussion of the left primary control valve will be representative. The left primary control includes the inlets 44a, 44b, and 44c in fluid communication with the source of brake pressure. The right primary control valve 40b includes corresponding inlets. The fluid inlets 44a and 44b are connected by a branch line 46, and each fluid inlet 44a and 44b preferably includes a restrictor line 48a, 48b, between the source of fluid pressure and the branch line. A left primary servovalve 47 is associated with the primary control valve, and operates to modulate the differential flow of fluid pressure through brake pressure lines 50a, 50b, to a servo return chamber 52, in fluid communication with the pressure return line 54. The operation of the servovalve 47 is controlled by a solenoid switch 58 responsive to control signals from a primary control signal generator 60. The right primary servovalve and solenoid are similarly responsive to signals from the control signal generator.

The right and left secondary control valves 42a, 42b are also substantially identical in structure and operation, so that discussion of the right secondary control valve should be representative. The right secondary control valve includes inlets 64a, 64b, 64c in fluid communication with the secondary brake pressure source. The right control valve is similarly associated with a secondary servovalve 65 modulating fluid pressure through the right secondary servo line branch 66, connecting the right secondary restrictor lines 68a, 68b, in fluid communication with secondary brake pressure source. The right secondary branch line 66 includes the brake pressure lines 70a, 70b to the servovalve return chamber 72, which is in turn in fluid communication with the secondary pressure return line 74, connecting to the secondary control valve return channel 76. The operation of the right secondary servovalve is controlled by the solenoid 78, which is in turn responsive to control signals generated from the backup control signal generator 79. The left secondary control valve operation and structure are similar to that of the right secondary control valve, and the left secondary servovalve functioning and structure are likewise similar to that of the right secondary servovalve, also being responsive to control signals generated by the backup control signal generator.

The individual control valves operate substantially identically in both of the primary and secondary brake valve control subsystems, but have different effects depending upon the fluid communications, which will be further described hereinafter. The structure and operation of the left primary control valve will be representative. The left primary control valve generally comprises a metering spool 80 contained within the metering spool chamber 81. As is illustrated in FIG. 1, the metering spool is slidable within the metering spool chamber between positions opening and closing the inlets and outlets to the metering spool chamber. Also slidably contained within the metering spool chamber at one end thereof is a movable stop member 82 having an inner recess 83 accepting one end 84 of the metering spool. At the other end of the metering spool, a spring 85 is mounted for biasing the metering spool in a direction opening the brake actuator port to return. This other end of the metering spool chamber is in fluid communication with the return line. A brake pressure fluid transfer chamber 88 connected with the right brake actuator, receives brake pressure from the control valve inlet chamber 90a in fluid communication with the brake pressure source, and from the stop member inner chamber 83, through an inner metering spool channel 92 communicating with these two chambers.

The primary brake valve control subsystem also includes a primary solenoid valve selector 32 controlling the movement of the stop member in each primary control valve. The valve selector includes, for example, a solenoid operated ball valve closure member 96 movable in an actuated position to close an inlet 98 from the brake pressure source and in an unactuated position to open the inlet from the brake pressure source and close the inlet 100 from the return line. A selector valve outlet line 102 communicates with the control valve stop member chamber portion 104 of each of the primary control valves, and also communicates with the brake pressure line from the primary solenoid valve selector outlet to a piston chamber 110 of the secondary valve selector 34. Thus, in operation, when the solenoid valve selector is actuated, inlet pressure is not communicated to the stop member of the control valve, so that the spool member is allowed to move as commanded by differential pressure from the servovalve for normal operation. However, once the solenoid valve selector is unactuated, inlet pressure is communicated through the solenoid valve selector outlet to each of the stop members of the primary control valves, forcing the stop member against the end of the spool member so that the primary control valve is driven to a full stop position, blocking inlet pressure and opening right and left brake lines to return. A primary electrical failure would cause the solenoid valve selector to operate in this fashion, and would also cause the control-valve to revert to an unactuated position, allowing the brake pressure to be in full communication with the return line. In this instance, primary inlet pressure would also be communicated to the secondary valve selector 34 through a connecting line 106.

The secondary valve selector includes the hydraulic piston chamber 110, a hydraulic piston 120 movable in the piston chamber, but biased in one direction by the piston spring 122. The piston is operatively engaged with a valve closure member such as a ball valve 124, operating to open an inlet from the pressure return line 126, in the direction of bias by the piston spring. The brake pressure line 128 is operatively connected with the primary source of brake pressure through line 106, the line 128 entering the piston chamber 110 to bias the piston 120 in the direction opposite to the direction biased by the piston spring 122. It should be pointed out that each of the control valves include an associated servovalve such as the right primary servovalve 132 and the left secondary servovalve 134, and that as an alternative, each of the primary and secondary valve control subsystems may include one servovalve.

The secondary valve selector also includes an inlet line 136 from the return line at the midportion of the closure member, so as to bias the closure member to receive pressure from the secondary brake pressure source in response to a deactivation of the secondary selectorvalve, which releases secondary brake pressure to the return line. Secondary inlet pressure enters the closure member chamber through inlet 138. Fluid pressure is communicated from the valve closure member chamber through the outlet 140 to the control valve stop member chamber of each of the secondary subsystem control valves. When fluid pressure is communicated to the secondary control valves in this manner, the control valves move to a closed or full stop position, which blocks secondary inlet pressure and opens secondary right and left brake actuator lines to return.

The secondary brake valve control subsystem also includes parking brake assembly 142 connected in line with the secondary source of brake pressure and the secondary return lines 76, so that a parking brake system is always operable, under manual control from a pilot.

Figure 2:
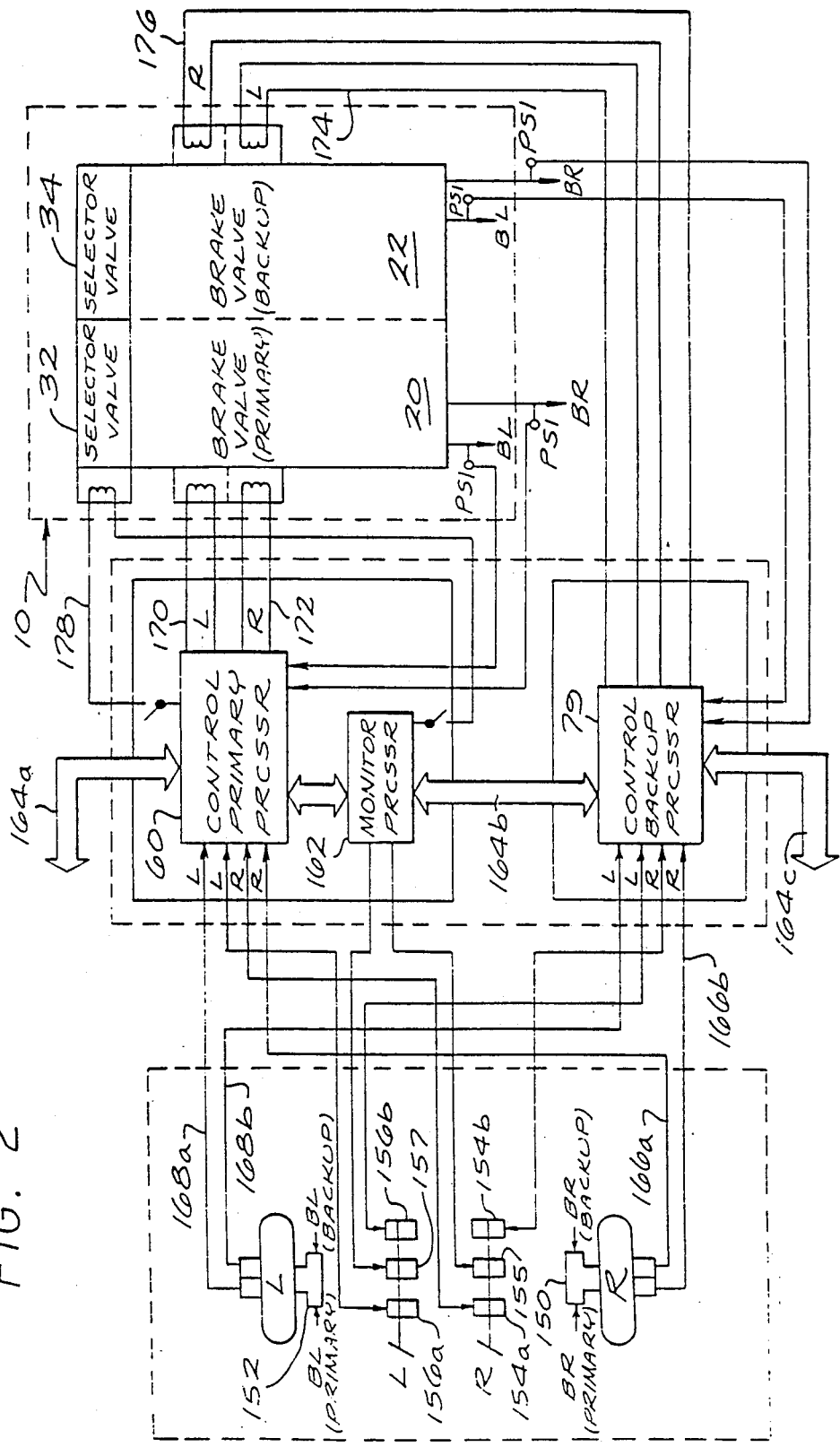
FIG. 2 is a schematic diagram of the brake valve control system with separate valve selectors.

With reference to FIG. 2, the brake valve control system is designed for use with a primary and backup brake system for an aircraft, exemplified in FIG. 2 with the preferred embodiment of the brake valve control system utilizing individual selector valves for each of the brake valve control subsystems. The aircraft typically includes a right brake actuator 150, a left brake actuator 152, right antiskid valves 154a, 154b, a right antiskid sensor, and left antiskid valves 156a, 156b, and left antiskid sensor 157. Each of the antiskid sensors generates electrical signals representing wheel rotational speed which are received by the monitor 162 which is in turn electrically connected with sensors monitoring operation of the primary control processor 60 and the backup control processor 79. The monitor, primary control processor and backup control processor are all connected in line via data link 164a, 164b, 164c, linked into the central aircraft computer system 10 for overall control and monitoring of the operation of the brake system. Right brake control monitoring lines 166a, 166b are connected to the primary control processor and backup control processor, respectively, for monitoring the operation of the right brake, and the left brake control lines 168a, 168b, are similarly connected to the primary control processor and the backup control processor respectively. The primary control processor further controls the operation of the primary and secondary servovalve through the control signals directed to the servovalves over the left primary control signal line 170 and the right primary control signal line 172. Similarly, the back up control processor controls actuation of the right and left servovalves through a left secondary control line 174 and the right secondary control signal line 176. The primary control processor also directs a control signal to the primary solenoid selector valves through the control line 178.

From the foregoing, it will be apparent that the brake valve control system of the invention is effective in eliminating the need for large electrical shut off valves and relay valves, and reduces the weight and cost of unnecessary duplication in providing an aircraft backup braking system. It is significant that the combination of the unique metering spool valve, servovalve, and subsystem selector valves allow for reduction in weight and complexity for the backup system.

Although specific embodiments of the invention have been described and illustrated, it is clear that the invention is susceptible to numerous modifications and adaptations within the ability of those skilled in the art and without the exercise of the inventive faculty. Thus, it should be understood that various changes in form, detail and use of the present invention may be made without departing from the spirit and scope of the invention.

We claim:

1. A brake valve control system for use in a wheel braking system including brake actuator means said brake valve control system comprising:
    a) a primary brake valve control subsystem for controlling said brake actuator means having a primary source of brake pressure in fluid communication with said brake actuator means, said primary brake valve control subsystem including at least one primary control valve having an inlet in fluid communication with said primary source of brake pressure and an outlet in fluid communication with said brake actuator means;
    b) a secondary brake valve control subsystem for controlling said brake actuator means in the event of failure of said primary brake valve control subsystem, said secondary brake valve control subsystem having a secondary source of brake pressure in fluid communication with said brake actuator means, said secondary brake valve control subsystem including at least one secondary control valve having an inlet in fluid communication with said secondary source of brake pressure and an outlet in fluid communication with said brake actuator means;
    c) subsystem selector means in fluid communication with said primary and secondary brake valve control subsystems operative to select either said primary or secondary brake valve control subsystems to actively control said brake actuator means and to simultaneously render the non-selected brake valve control subsystem inactive, whereby said subsystem selector means is operative to override any failure in either the primary or secondary brake valve control subsystem, each said control valve including a housing, a metering spool in said housing controlling fluid communication between said sources of brake pressure with said brake actuator means, and means for deactivating said control valves, comprising a slidable stop member movable between an open position and a closed position for closing communication between said sources of brake pressure and said brake actuator means in response to fluid pressure from said subsystem selector means.

2. The brake valve control system of claim 1, wherein said primary brake valve control subsystem includes primary servovalve means in fluid communication with said primary source of brake pressure and in fluid communication with a primary brake pressure return line operative in a normal actuated position to modulate fluid pressure to said primary metering spool valve and wherein said secondary brake valve control subsystem includes secondary servovalve means in fluid communication with said secondary source of brake pressure and in fluid communication with a secondary brake pressure return line operative in a normal actuated position to modulate fluid pressure to said secondary metering spool valve.

3. The brake valve control system of claim 2, further comprising a control signal generator means for generating a control signal, and each of said primary and secondary servovalve means are operative to move between said actuated and said unactuated positions in response to said control signal.

4. The brake valve control system of claim 3, wherein control signal generator includes antiskid brake control means and said brake actuator means includes antiskid valves and antiskid monitoring means, said control signal being generated responsive to said antiskid valves and said antiskid monitoring means.

5. The brake valve control system of claim 4, wherein said antiskid control means is operatively connected to inboard computer processing means.

6. The brake valve control system of claim 4, wherein said antiskid control means comprises an antiskid control primary processor, each of said antiskid control processors being operatively connected to said brake actuator means, and being operatively connected to a central monitor processor operative to control each of said antiskid control processors, said central monitor processor being operatively connected to said brake actuator monitoring means, and said subsystem selector means being operatively connected to said antiskid control primary processor and said central monitor processor.

7. The brake valve control system of claim 1, wherein said subsystem selector means comprises primary valve selector means having an outlet in fluid communication with a primary means for deactivating said primary control valve, and an inlet in fluid communication with said primary brake pressure return line, said primary valve selector means being operative in a first normally actuated position to block fluid communication between said primary pressure line and said primary means for deactivating, and operative in a second, unactuated position to allow fluid communication between said primary pressure line and said primary means for deactivating said primary control valve; and secondary valve selector means having an outlet in fluid communication with a secondary means for deactivating said secondary control valve, a first inlet in fluid communication with said secondary source of brake pressure and operative in a first position to open fluid communication between said secondary source of brake pressure and said secondary means for deactivating said secondary control valve, and operative in a second position to block communication between said secondary source of brake pressure and means for deactivating; said secondary valve selector means having a second inlet in fluid communication with said primary valve selector means outlet and operative to move said secondary valve selector means to said second position in response to pressure from said primary valve selector means outlet; and said second valve selector means having a third inlet in fluid communication with said primary return line and operative to move said secondary valve selector to said first position in response to pressure from said primary return line; whereby when said primary valve selector means is in an unactuated position, said primary control valve is closed to fluid communication with said brake actuator means, and said secondary control valve is open to fluid communication with said brake actuator means.

8. The brake valve control system of claim 7, further including a control signal generator for generating a control signal, and said primary valve selector means is operative to move between said actuated and said unactuated positions responsive to said control signal.

9. A brake valve control system for use in an aircraft wheel braking system having brake actuator means, comprising:
 a primary brake valve control subsystem for controlling said brake actuator means, having a primary source of brake pressure in fluid communication with said brake actuator means;
 at least one primary control valve including a housing, a metering spool in said housing controlling fluid communication between said primary source of brake pressure with said brake actuating means, and a slidable stop member movable between an open position and a closed position for closing communication between said primary source of brake pressure and said brake actuator means in response to fluid pressure from said subsystem selector means, said primary control valve having an inlet in fluid communication with said primary source of brake pressure and an outlet in fluid communication with said brake actuator means;
 primary valve selector means having an outlet in fluid communication with said primary control valve slidable stop member, and an inlet in fluid communication with a primary brake pressure return line, said primary brake valve selector means being operative in a first normally actuated position to open fluid communication between said primary return line and said primary control valve slidable stop member, and operative in a second, unactuated position, to allow fluid communication between said primary pressure line and said primary control valve slidable stop member;
 a secondary brake valve control subsystem for controlling said brake actuator means, having a secondary source of brake pressure in fluid communication with said brake actuator means;
 at least one secondary control valve including a housing, a metering spool in said housing controlling fluid communication between said secondary source of brake pressure with said brake actuator means, and a slidable stop member movable between an open position and a closed position for closing communication between said secondary source of brake pressure and said brake actuator means in response to fluid pressure from said subsystem selector means, said secondary control valve having an inlet in fluid communication with said secondary source of brake pressure and an outlet in fluid communication with said brake actuator means;
 secondary valve selector means having an outlet in fluid communication with said secondary control valve slidable stop member, a first inlet in fluid communication with said secondary source of brake pressure and operative in a first position to open fluid communication between said secondary source of brake pressure and said secondary control valve slidable stop means, and operative in a second position to block communication between said secondary source of brake pressure and said secondary control valve slidable stop means;
 said secondary valve selector means having a second inlet in fluid communication with said primary valve selector means outlet and operative to move said secondary valve selector means to said second position in response to pressure from said primary valve selector means outlet;
 said secondary valve selector means having a third inlet in fluid communication with said primary return line and operative to move said secondary valve selector to said first position in response to pressure from said primary return line;
 whereby when said primary valve selector means is in an unactuated position, said primary control valve is closed to fluid communication with said brake actuator means, and said secondary control valve is open to fluid communication with said brake actuator means.

10. The brake valve control system of claim 9, further including a control signal generator for generating a control signal, and said primary valve selector means is operative to move between said actuated and said unactuated positions responsive to said control signal.

11. The brake valve control system of claim 10, wherein said control signal generator includes antiskid brake control means and said brake actuator means includes antiskid valves and antiskid monitoring means, said control signal being generated responsive to said antiskid monitoring means.

12. The brake valve control system of claim 11, wherein said antiskid control means is operatively connected to onboard computer processing means.

13. The brake valve control system of claim 11, wherein said antiskid control means comprises an antiskid control primary processor, and an antiskid control secondary processor, each of said antiskid control processors being operatively connected to said brake actuator means, and being operatively connected to a central monitor processor to control each of said antiskid control processors, said central monitor processor being operatively connected to said brake actuator monitoring means, and said subsystem selector means being operatively connected to said antiskid control primary processor and said central monitor processor.

* * * * *